(12) United States Patent
Takahashi

(10) Patent No.: US 10,122,876 B2
(45) Date of Patent: Nov. 6, 2018

(54) IMAGE READING APPARATUS AND IMAGE FORMING APPARATUS

(71) Applicant: CANON KABUSHIKI KAISHA, Tokyo (JP)

(72) Inventor: Hiroyuki Takahashi, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/608,624

(22) Filed: May 30, 2017

(65) Prior Publication Data

US 2017/0359470 A1    Dec. 14, 2017

(30) Foreign Application Priority Data

Jun. 13, 2016 (JP) .................. 2016-117245

(51) Int. Cl.
| | |
|---|---|
| *H04N 1/04* | (2006.01) |
| *H04N 1/00* | (2006.01) |
| *B65H 3/06* | (2006.01) |
| *G03G 15/00* | (2006.01) |
| *H04N 1/31* | (2006.01) |

(52) U.S. Cl.
CPC ......... *H04N 1/0057* (2013.01); *B65H 3/0653* (2013.01); *G03G 15/602* (2013.01); *H04N 1/00628* (2013.01); *H04N 1/31* (2013.01); *H05K 999/99* (2013.01)

(58) Field of Classification Search
CPC ........... H04N 1/00551; H04N 1/00557; H04N 1/00519; H04N 1/0083; H04N 1/2307; H04N 2201/0094; H04N 1/00496; H04N 1/00525; H04N 1/00543; H04N 1/1061; H04N 1/0057; H04N 1/00628; H04N 1/31; B65H 3/0653
USPC ..... 358/474, 498, 497, 1.13, 296, 496, 1.12, 358/401, 527; 399/88, 51
See application file for complete search history.

(56) References Cited

U.S. PATENT DOCUMENTS

| | | | |
|---|---|---|---|
| 8,514,463 B2 | 8/2013 | Fujiwara | ............ 358/474 |
| 2003/0118382 A1* | 6/2003 | Tomatsu | ........ G03G 15/2064 |
| | | | 399/328 |
| 2004/0041333 A1* | 3/2004 | Izumi | ............ G03G 15/6529 |
| | | | 271/145 |

(Continued)

FOREIGN PATENT DOCUMENTS

JP    2011-077874    4/2011

*Primary Examiner* — Negussie Worku
(74) *Attorney, Agent, or Firm* — Fitzpatrick, Cella, Harper & Scinto

(57) ABSTRACT

An image reading apparatus includes a reading unit, a conveyance unit configured to convey the sheet, a support portion configured to support the conveyance unit openably and movably with respect to the reading unit in a vertical direction between an upper position and a lower position, a bundled wire transmitting a signal or electric power to the conveyance unit, and a cover portion configured to cover the bundled wire. The cover portion includes a first cover member provided on the conveyance unit and a second cover member provided movably in the vertical direction with respect to the reading unit. A whole length of the cover portion in the vertical direction in a case where the conveyance unit is located at the upper position is longer than a whole length of the cover portion in a case where the conveyance unit is located at the lower position.

15 Claims, 8 Drawing Sheets

(56) References Cited

U.S. PATENT DOCUMENTS

| | | | | |
|---|---|---|---|---|
| 2011/0235139 A1* | 9/2011 | Kurokawa | ............. | G03G 15/60 |
| | | | | 358/498 |
| 2011/0235140 A1* | 9/2011 | Ito | ........................ | G03G 15/605 |
| | | | | 358/498 |
| 2012/0207504 A1* | 8/2012 | Hamaya | ............. | G03G 15/5004 |
| | | | | 399/88 |
| 2012/0230005 A1* | 9/2012 | Ota | ...................... | H05K 5/0247 |
| | | | | 361/827 |
| 2014/0043409 A1* | 2/2014 | Suzuki | ................. | B41J 2/17553 |
| | | | | 347/86 |
| 2016/0094739 A1* | 3/2016 | Xie | .................... | H04N 1/00525 |
| | | | | 358/474 |

* cited by examiner

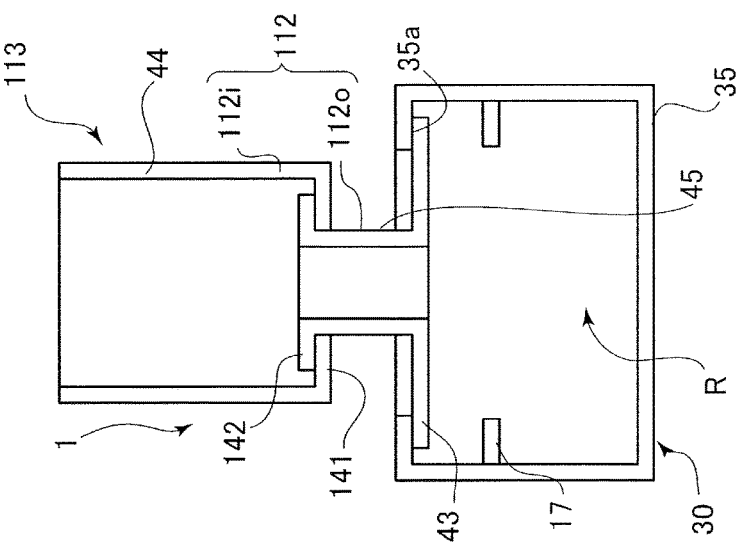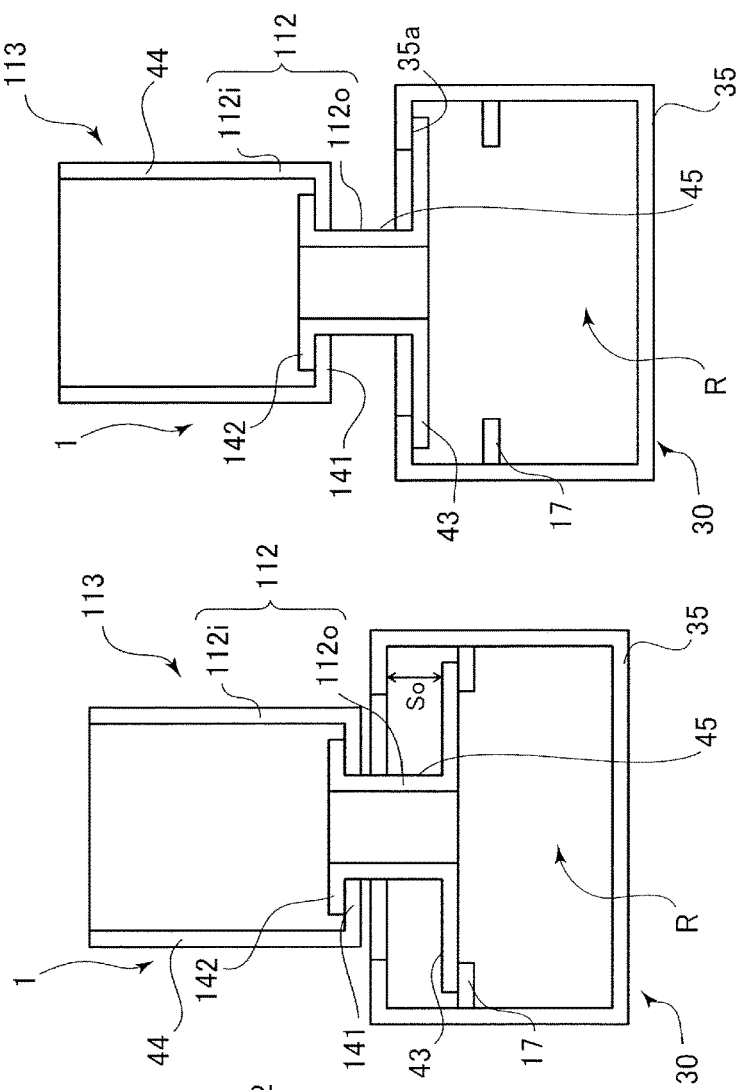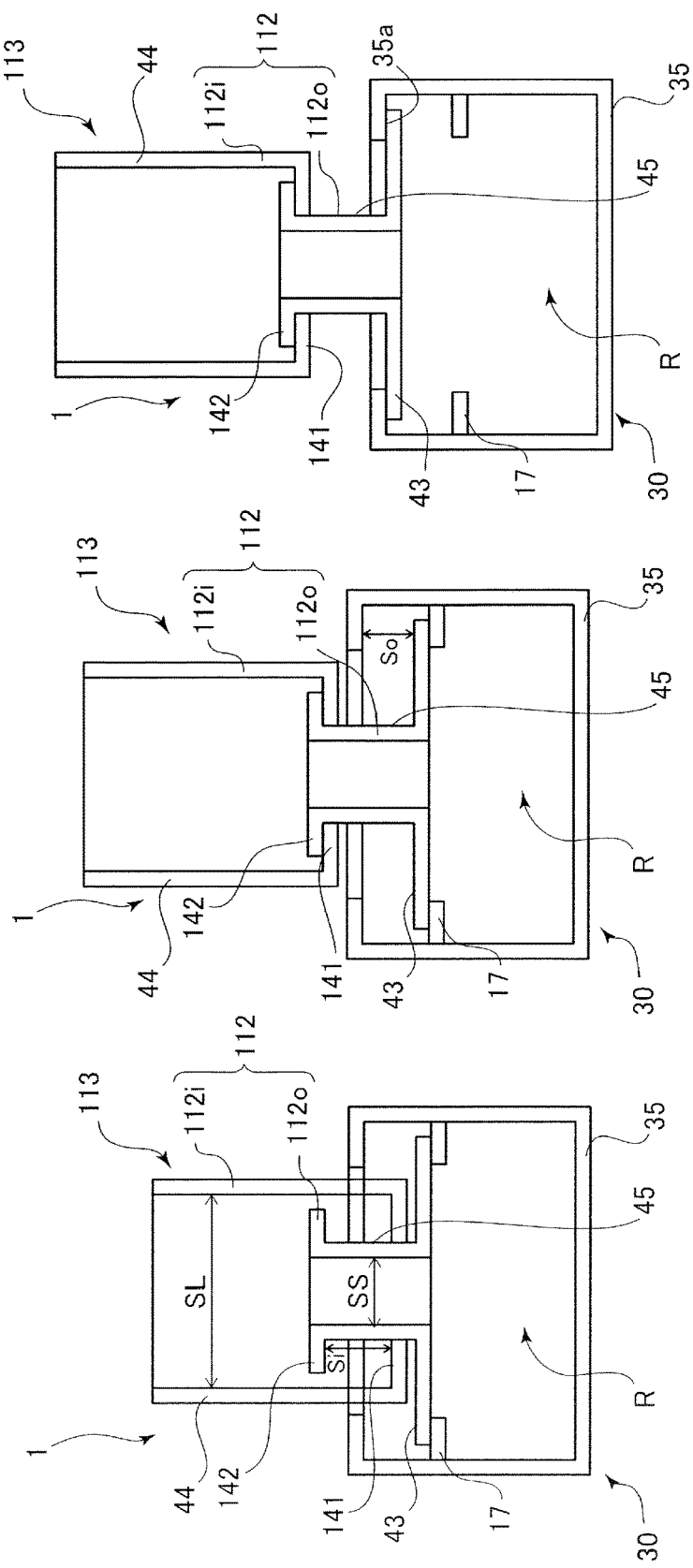

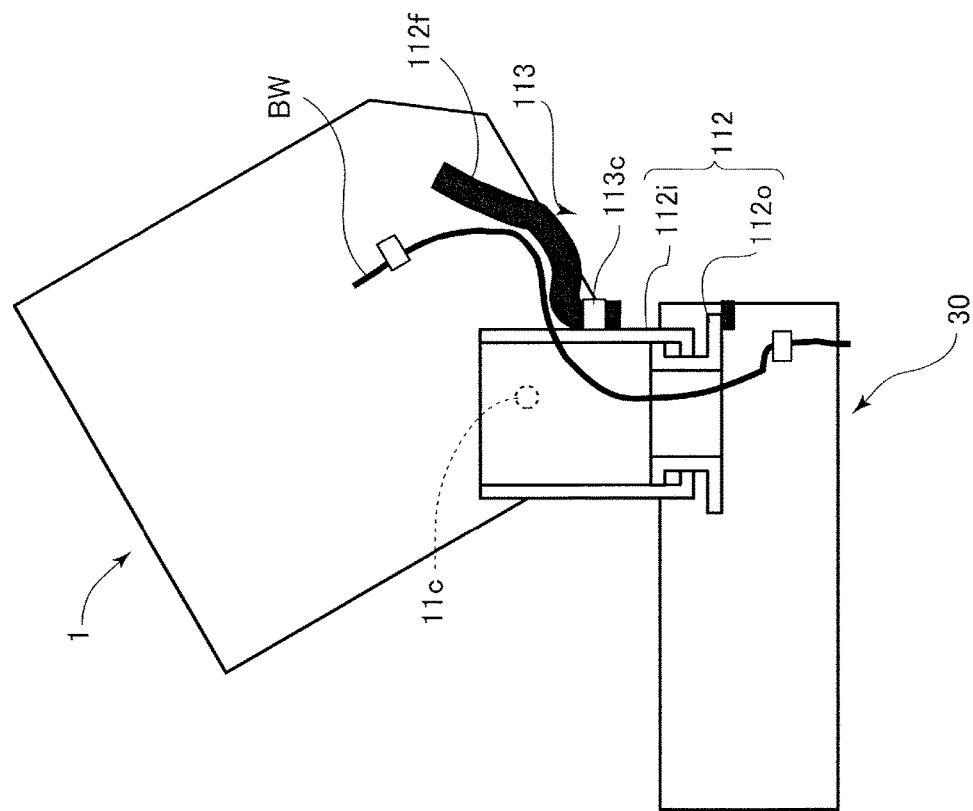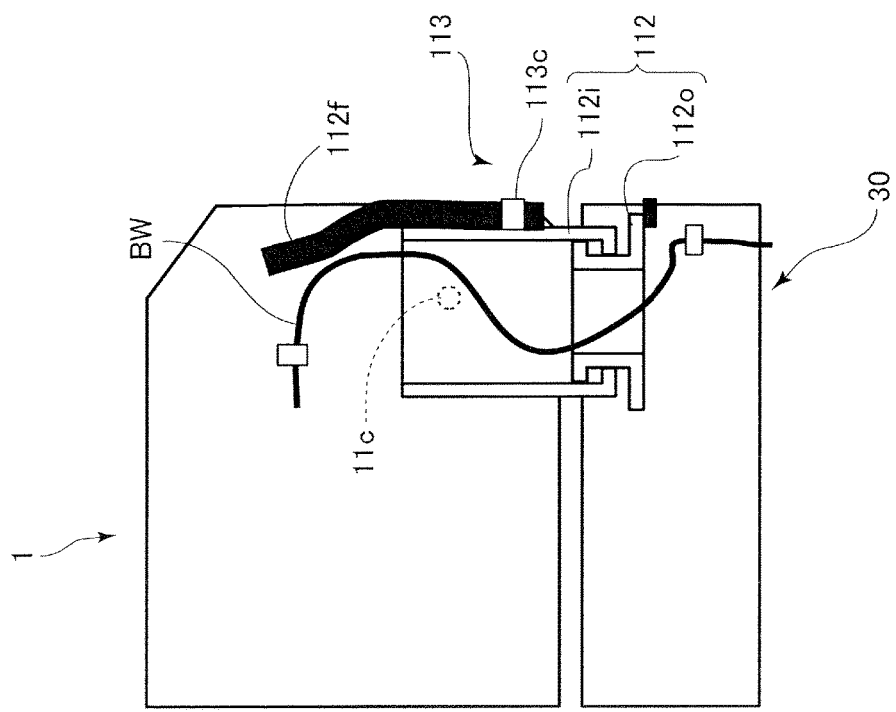

IMAGE READING APPARATUS AND IMAGE FORMING APPARATUS

BACKGROUND OF THE INVENTION

Field of the Invention

The present invention relates to an image reading apparatus configured to read an image of a sheet and an image forming apparatus including the image reading apparatus.

Description of the Related Art

There is generally known an image reading apparatus including an automatic document feeder (referred to as an 'ADF' hereinafter) configured to automatically feed a document and a reading unit configured to read an image of the document fed by the ADF. The ADF is supported openably and vertically movably with respect to the reading unit.

A user of the image reading apparatus can perform a so-called fixed-reading mode of reading the image of the document by placing the document on a document stage glass provided on an upper surface of the reading unit in a state in which the ADF is opened. Still further, because the ADF is configured to be movable upward with respect to the reading unit, it is possible to press a document by the ADF and to prevent the document from being displaced in reading the document even if a thick bundle of documents is placed on the document glass.

Hitherto, an image processing apparatus configured to electrically connect a main unit such as a copier provided under the reading unit with the ADF by a flat cable and including a holder member configured to cover the flat cable being bent as disclosed in Japanese Patent Application Laid-open No. 2011-77874. The holder member slides upward or downward the reading unit along with a vertical move of the ADF, and a bottom portion of the holder member comes into contact with the reading unit when the ADF is located at a lower position.

In the image processing apparatus disclosed in Japanese Patent Application Laid-open No. 2011-77874, the flat cable is communicated through to an opening defined through the bottom portion of the holder member to wire the flat cable to the main unit. However, in a case when the image processing apparatus is to be attached to a plurality of types of main units whose flat cable connecting positions are different from each other for example, a space in which the flat cables are routed is required within the reading unit. It is then necessary to save a space of the holder member in order to assure the space for routing the flat cable within the reading unit.

SUMMARY OF THE INVENTION

According to one aspect of the present invention, An image reading apparatus includes a reading unit including a transparent portion and a reading portion configured to read an image on a sheet through the transparent portion, a conveyance unit disposed above the reading unit and configured to convey the sheet toward the transparent portion, a support portion configured to support the conveyance unit openably and movably with respect to the reading unit in a vertical direction between an upper position and a lower position, a bundled wire transmitting a signal or electric power to the conveyance unit and passing through the reading unit, and a cover portion configured to cover the bundled wire between the reading unit and the conveyance unit, the cover portion including a first cover member provided on the conveyance unit and a second cover member provided movably in the vertical direction with respect to the reading unit and so as to overlap with the first cover member at inside or outside of the first cover member in a plane orthogonal to the vertical direction, wherein a whole length of the cover portion in the vertical direction in a case where the conveyance unit is located at the upper position is longer than a whole length of the cover portion in the vertical direction in a case where the conveyance unit is located at the lower position.

Further features of the present invention will become apparent from the following description of exemplary embodiments with reference to the attached drawings.

BRIEF DESCRIPTION OF THE DRAWINGS

FIG. 7A is a schematic diagram illustrating a configuration of a duct of a second embodiment in the state in which the ADF is located at the lower position.

FIG. 7B is a schematic diagram illustrating the configuration of the duct in a state in which a first duct is in contact with a second duct.

FIG. 7C is a schematic diagram illustrating the configuration of the duct in the state in which the ADF is located at the upper position.

FIG. 8A is a schematic diagram illustrating the lid portion in the state in which the ADF is closed.

FIG. 8B is a schematic diagram illustrating the configuration of the lid portion in the state in which the ADF is opened halfway.

DESCRIPTION OF THE EMBODIMENTS

First Embodiment

An image reading apparatus and an image forming apparatus of the present disclosure will be described below with reference to the drawings. It is noted that an applicable range of the present technology is not intended to limit only to dimensions, materials, shapes, relative dispositions and others of components described in the following embodiments unless so specified.

(Schematic Configuration of Printer)

Figure 1:
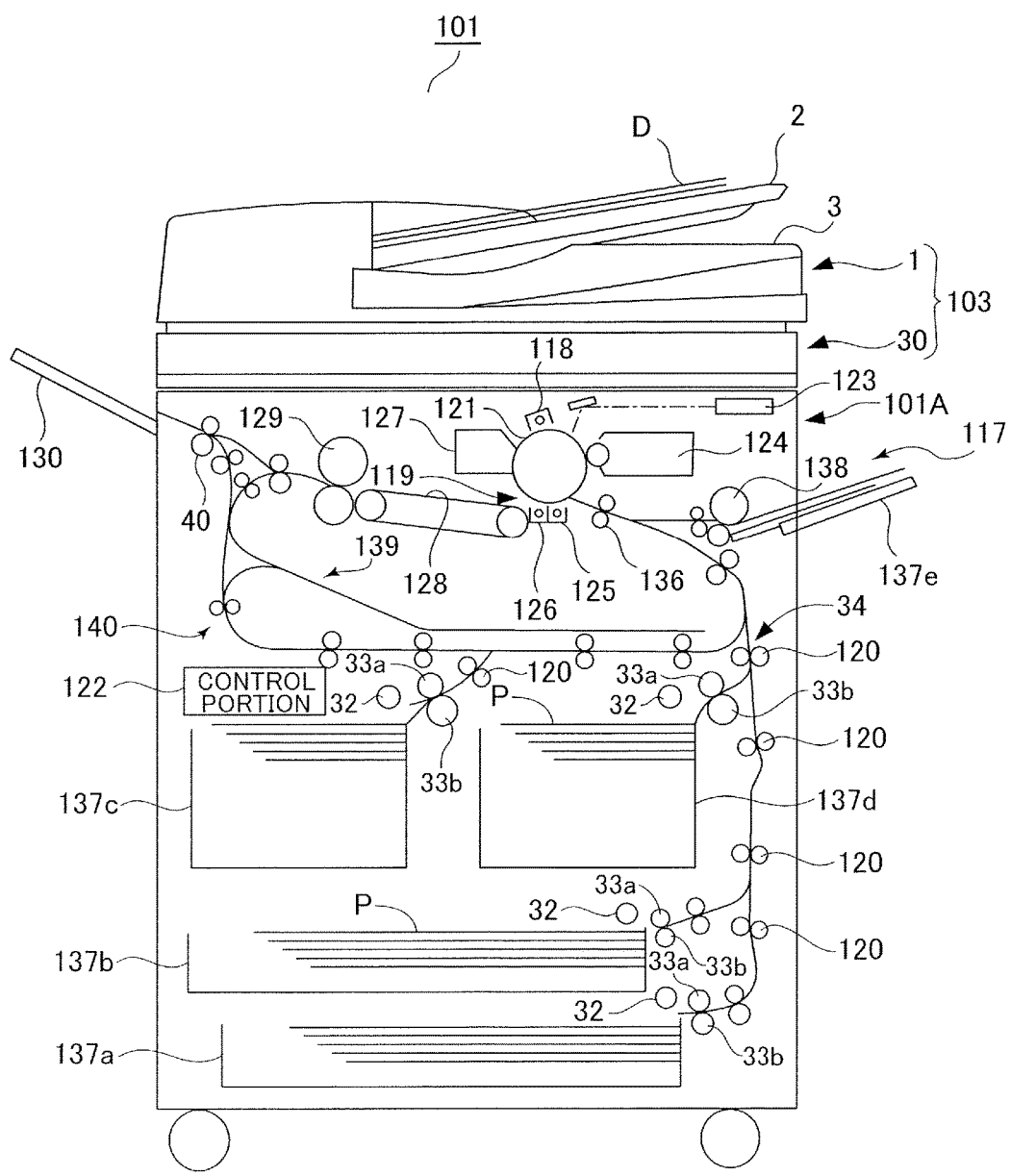
FIG. 1 is a schematic diagram illustrating an entire configuration of a printer of a first embodiment.

At first, a schematic configuration of a printer 101 serving as the image forming apparatus of the present disclosure will be described with reference to FIG. 1. As illustrated in FIG. 1, the printer 101 includes a printer body 101A, i.e., an image forming unit, and the image reading apparatus 103. The image reading apparatus 103 disposed above the printer body 101A includes a reading unit 30 and an ADF 1 detailed later and optically scans a document D to read image information on the document D. The document D is a sheet such as a sheet of paper and an envelope, a plastic film such as an overhead projector transparent sheet (OHT), and a cloth.

The image information converted into an electrical signal by the image reading apparatus 103 is transferred to a control portion 122 provided in the printer body 101A. It is noted that in the present embodiment, a front surface side of the image forming apparatus will be defined as a front side and a back surface side of the apparatus as a rear side when a user of the apparatus stands in front of an operation panel not illustrated to operate the printer 101. That is, FIG. 1 is a schematic diagram illustrating a whole view of the printer 101 when viewed from the front side to the back side.

The printer body 101A includes an image forming portion 119 configured to form an image onto a sheet P, i.e., a recording medium, a sheet feed portion 34 and a manual feed portion 117 configured to feed the sheet P to the image forming portion 119. The sheet feed portion 34 includes sheet storage portions 137a, 137b, 137c and 137d configured to be able to store sheets having different sizes from each other. The sheet stored in each sheet storage portion is delivered out by a pickup roller 32 and is passed to a corresponding conveyance roller pair 120 by being separated one by one by a feed roller 33a and a retard roller 33b. Then, the sheet P is passed sequentially to the plurality of conveyance roller pairs 120 disposed along a sheet conveyance path to be conveyed to a registration roller pair 136.

It is noted that a sheet P placed by the user on a manual feed tray 137e of the manual feed portion 117 is fed by a feed roller 138 to an inside of the printer body 101A and is conveyed to the registration roller pair 136. The registration roller pair 136 corrects a skew of the sheet P by halting a leading edge of the sheet P and resumes the conveyance of the sheet P corresponding to an advance of an image forming operation, i.e., a toner image forming process, of the image forming portion 119.

The image forming portion 119 configured to form the image onto the sheet P is an electro-photographic unit including a photosensitive drum 121 serving as a photosensitive body. The photosensitive drum 121 is configured to rotate along a conveyance direction of the sheet P. Provided around the photosensitive drum 121 are an electrifier 118, an exposure unit 123, a developer 124, a transfer electrifier 125, a separation electrifier 126 and a cleaner 127. The electrifier 118 is configured to homogeneously electrify a surface of the photosensitive drum 121, and the exposure unit 123 is configured to expose the photosensitive drum 121 in response to the image information inputted from the image reading apparatus 103 or the like to form an electrostatic latent image on the photosensitive drum 121.

The developer 124 stores two-component developer containing toner and carrier and develops the electrostatic latent image as a toner image by supplying the electrified toner to the photosensitive drum 121. The toner image borne on the photosensitive drum 121 is transferred by a bias electric field formed by the transfer electrifier 125 onto the sheet P conveyed from the registration roller pair 136. The sheet P onto which the toner image has been transferred separates from the photosensitive drum 121 by a bias electric field formed by the separating electrifier and is conveyed by a pre-fixing conveyance portion 128 to a fixing portion 129. It is noted that adhesive such as transfer residual toner left on the photosensitive drum 121 without being transferred onto the sheet P is removed by the cleaner 127 such that the photosensitive drum 121 is ready for a next image forming operation.

The sheet P conveyed to the fixing portion 129 is heated while being nipped and pressed by the roller pair such that the toner melts and adheres to the image. Thus, the image is fixed to the sheet P. In a case when the output of the image has been completed, the sheet P on which the fixed image has been obtained is discharged through a discharge roller pair 40 onto a discharge tray 130 projecting out of the printer body 101A. In a case of a duplex printing in which an image is to be formed on a back surface of the sheet P, the sheet P which has passed through the fixing portion 129 is reversed such that the front surface is switched to the back surface by a reversing portion 139 and is conveyed by a duplex conveyance portion 140 to the registration roller pair 136. Then, the sheet P on which the image has been formed again by the image forming portion 119 is discharged onto the discharge tray 130.

(Image Reading Apparatus)

Figure 2:
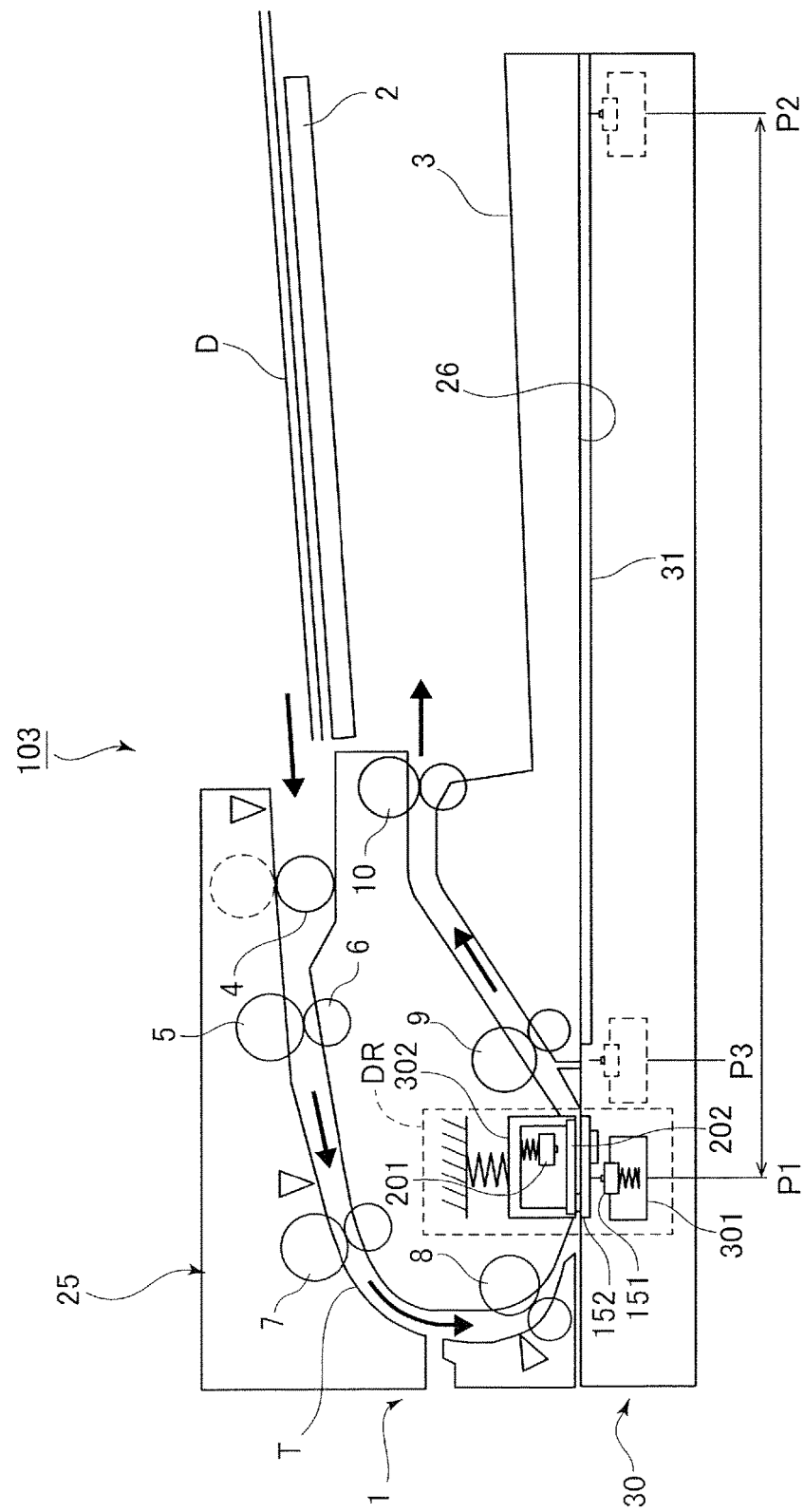
FIG. 2 is a side section view illustrating an image reading apparatus.

Next, a configuration of the image reading apparatus 103 will be described with reference to FIG. 2. As illustrated in FIG. 2, the image reading apparatus 103 is composed of the reading unit 30 and the ADF 1 disposed above the reading unit 30 and serving as a conveyance unit. The image reading apparatus 103 includes a duplex reading portion DR composed of a first reading portion 151 disposed within the reading unit 30 and a second reading portion 201 disposed within the ADF 1.

The first reading portion 151 is held by a first holder 301 and reads an image on a first surface of the document D through a first platen glass 152, i.e., a transparent portion. The second reading portion 201 is held by a second holder 302 and reads an image on a second surface, i.e., a surface opposite from the first surface, of the document D through a second platen glass 202. The first surface of the document D of the present embodiment is a lower side surface of the document D in the duplex reading portion DR, and the second surface is an upper side surface of the document D in the duplex reading portion DR. It is noted that the first and second reading portions 151 and 201 are configured so as not to always execute simultaneous reading of the both surfaces and may execute reading of only one surface.

Each of the first and second reading portions 151 and 201 consists of a contact image sensor (referred to as a 'CIS' hereinafter) which is a non-magnification optical scanning device. The first and second reading portions 151 and 201 include light sources composed of an array of LEDs arrayed in a main scan direction orthogonal to a conveyance direction of the document D and a plurality of light receiving elements similarly arrayed in the main scan direction. Light irradiated from the LED array and reflected by the document D is imaged through a lens on each light receiving element and is photo-electrically converted by the light receiving element.

The reading unit 30 is fixed on an upper surface of the printer body 101A (see FIG. 1). As illustrated in FIG. 2, a document placing table 31 serving as a flat-bed type placing portion on which the document D can be placed is disposed on an upper surface of the reading unit 30. The first holder 301 configured to hold the first reading portion 151 is movable in a sub-scan direction from a first position P1 to a second position P2 as illustrated in FIG. 2.

Figure 3A:
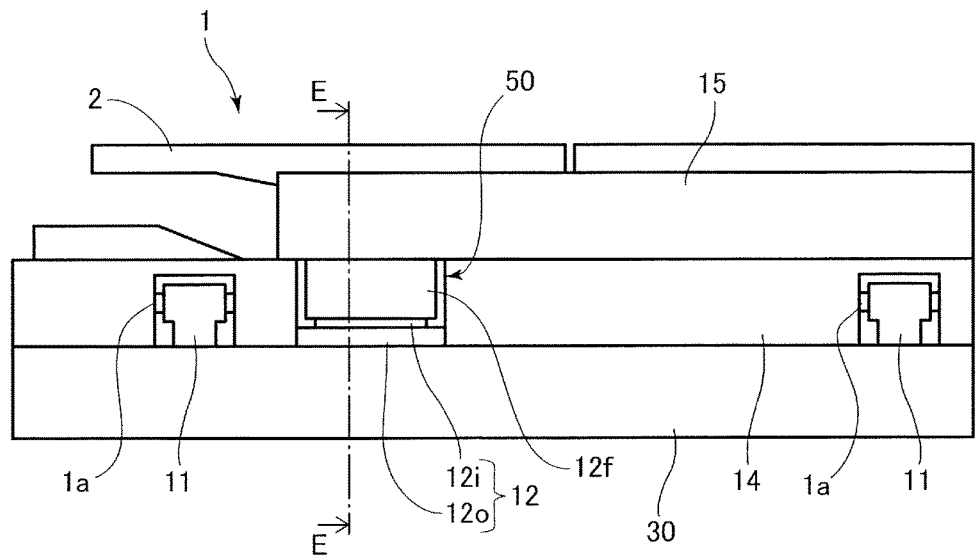
FIG. 3A is a back view illustrating a hinge mechanism in a state in which an ADF is located at a lower position.
Figure 3B:
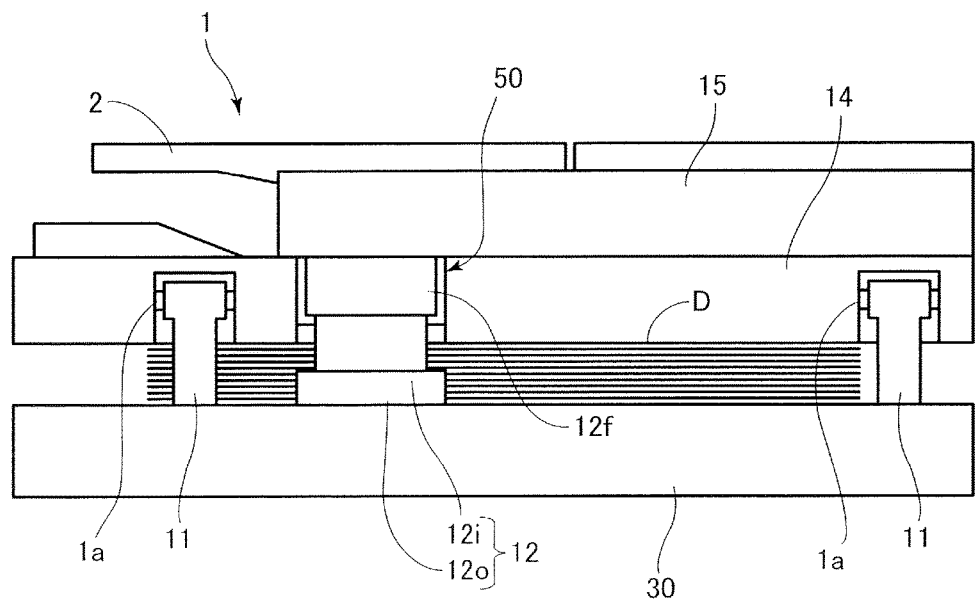
FIG. 3B is a back view illustrating the hinge mechanism in a state in which the ADF is located at an upper position.

As illustrated in FIG. 3A, hinge mechanisms 11 serving as two support portions are provided on the rear side of the image reading apparatus 103. Each hinge mechanism 11 is supported movably in the vertical direction with respect to the reading unit 30. The hinge mechanism 11 also supports a turning shaft 1a of the ADF 1 turnably at an upper portion thereof. That is, the hinge mechanism 11 supports the ADF 1 openably/closably and movably in the vertical direction between the upper and lower positions with respect to the reading unit 30. For instance, in a case when a thick bundle of documents D is placed on the document placing table 31 as illustrated in FIG. 3B, the ADF 1 is displaced upward with respect to the reading unit 30 and is closed in this state by being turned centering on the turning shaft 1a. It is noted that the position to which the ADF 1 is displaced to an uppermost position with respect to the reading unit 30 will be referred to as the upper position (see FIG. 5C) and the position to which the ADF 1 is displaced to a lowermost position will be referred to as the lower position (see FIG. 5A).

Besides the second reading portion 201, the ADF 1 also includes a document feed tray 2, a document conveyance portion 25, and a pressure plate portion 26. The document feed tray 2 is configured to support the document D placed by the user. The pressure plate portion 26 is provided at an under surface of the ADF 1 and is configured to press the document D placed on the document placing table 31 from above. The ADF 1 also includes a document conveyance path T defined within the ADF 1 so as to feed the document D placed on the document feed tray 2 to the duplex reading portion DR.

The ADF 1 will be described below in detail. The ADF 1 includes a pickup roller 4, a feed roller 5, a retard roller 6, a registration roller pair 7, a pair of conveyance rollers 8 and 9, and a discharge roller pair 10 sequentially in this order along a document conveyance direction, i.e., a sheet conveyance direction indicated by arrows in FIG. 2. The pickup roller 4 is configured to be vertically movable with respect to the upper surface of the document feed tray 2 and to start to feed the document D by coming into contact with the document D on the document feed tray 2. The feed roller 5 is configured to convey the document D received from the pickup roller 4 downstream of the conveyance direction. The retard roller 6 is in pressure contact with the feed roller 5. A rotational drive in a direction opposite to the conveyance direction is inputted to the retard roller 6 through a torque limiter not illustrated to separate the document D conveyed by the feed roller 5 one by one.

The registration roller pair 7 receives a leading edge of the document D conveyed by the feed roller 5 while halting its rotation and bends the document D to correct its skew. The registration roller pair 7 also conveys the document D whose skew has been corrected through the curved document conveyance path T to pass to the conveyance roller pair 8. The conveyance roller pair 8 sends the document D to the duplex reading portion DR to pass to the downstream conveyance roller pair 9. At this time, the images of the document D are read by the first and second reading portions 151 and 201. The conveyance roller pair 9 passes the document D which has passed through the duplex reading portion DR to the discharge roller pair 10. The discharge roller pair 10 discharges the document D to the document discharge portion 3.

The image reading apparatus 103 constructed as described above reads the image information from the document D in a feeding-reading mode of scanning the document image while feeding the document D by the ADF 1 and in a fixed-reading mode of scanning the document placed on the document placing table 31. The feeding-reading mode is selected in a case when the image reading apparatus 103 detects the document D placed on the document feed tray 2 or when the user clearly specifies this mode through a control panel or the like of the printer body 101A. In this case, the ADF 1 feeds the document D one by one to the duplex reading portion DR in a state in which the first reading portion 151 is located at the position P1. Then, the first and second reading portions 151 and 201 both irradiate the document D with scan lights to scan the both images in the case of simultaneously reading the both surfaces, and one of the first and second reading portions 151 and 201 irradiate the document D with scan light to scan the image in the case of reading one surface. The image information converted into the electrical signal by the light receiving elements is transferred to the control portion 122 of the printer body 101A.

Meanwhile, the fix document reading mode is selected in a case when the image reading apparatus 103 detects the document D placed on the document placing table 31 or when the user clearly specifies this mode through the control panel or the like of the printer body 101A. In the case of the fixed-reading mode, the user opens the ADF 1 at first to place the document D on the document placing table 31 and closes the ADF 1 to interpose the document D between the document placing table 31 and the pressure plate portion 26. Then, the first reading portion 151 scans the document D placed on the document placing table 31 by irradiating light while moving between the positions P3 and P2 along the document placing table 31. The image information converted into an electrical signal by the light receiving elements of the first reading portion 151 is transferred to the control portion 122 of the printer body 101A.

Figure 4A:
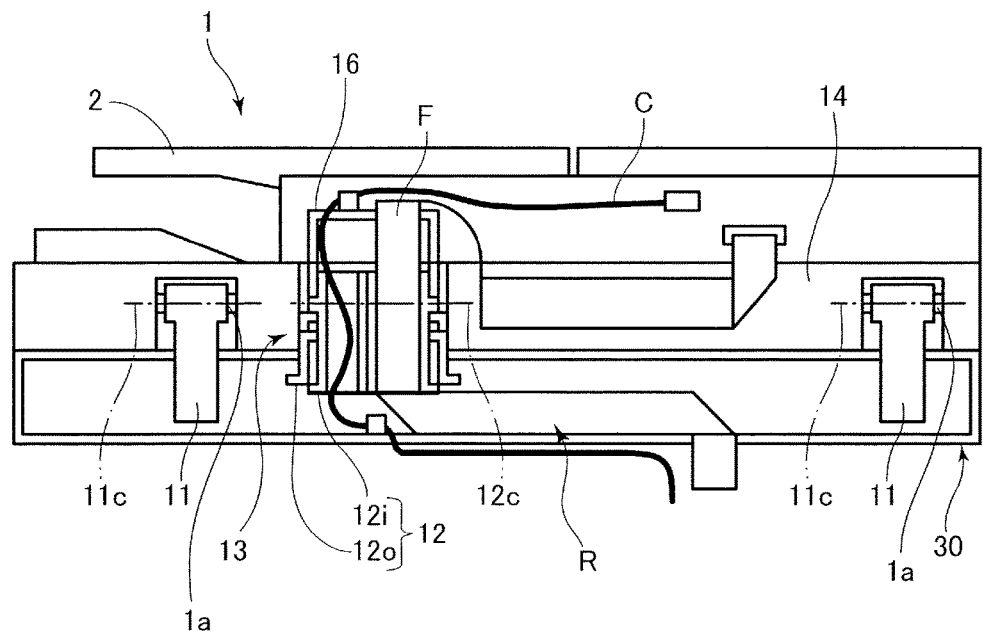
FIG. 4A is a section view illustrating wiring routes of flat cables and signal lines in the state in which the ADF is located at the lower position.
Figure 4B:
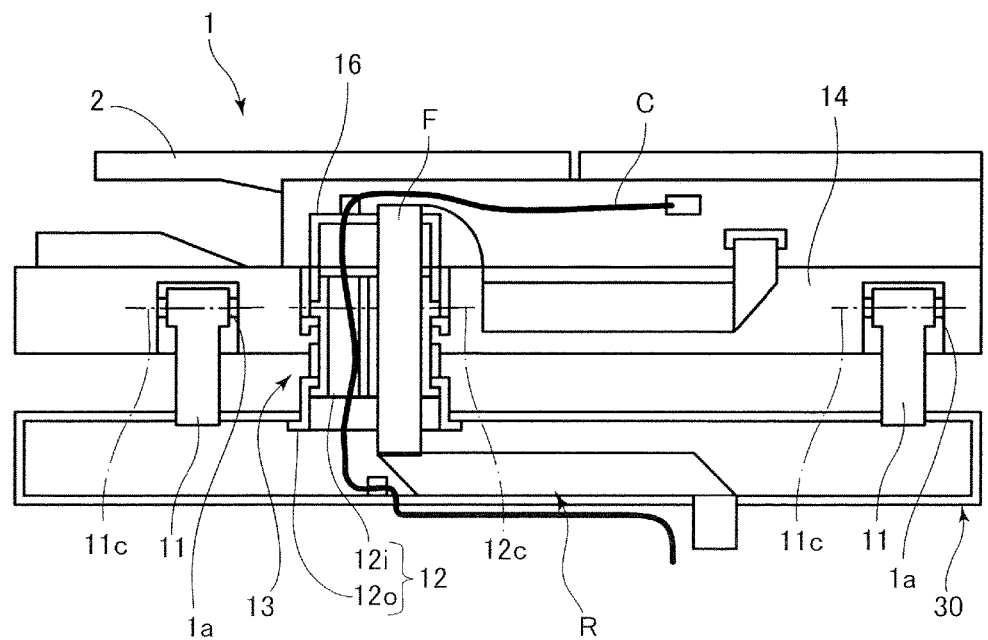
FIG. 4B is a section view illustrating wiring routes of flat cables and signal lines in the state in which the ADF is located at the upper position.

As illustrated in FIGS. 4A and 4B, a flat cable F is used as a signal line transmitting the signal of the image read by the second reading portion 201 to the control portion 122. Besides the flat cable F, a signal line C is disposed to transmit a signal and power to a motor or the like. It is preferable to connect these signal lines to the control portion 122 within the printer body 101A through a same route within the reading unit 30 to improve assembly workability and maintainability of the apparatus. Still further, it is necessary not to expose the flat cable F to the outside because otherwise a noise may be intruded in the signal due to an influence of static electricity. It is also preferable to wire the signal line C which is coated more than the flat cable F within the reading unit 30 and the printer body 101A so as not to be broken or damaged by external force generated during an operation of the user.

(Wiring Route)

Next, wiring routes of the flat cable F and the signal line C will be described. As illustrated in FIGS. 4A and 4B, the ADF 1 includes a cable guide 16 fixed to a frame 14 of the ADF 1 and serving as a holding portion holding the flat cable F and the signal line C in a flexible condition. A duct 13 serving as a cover portion covering the flat cable F and the signal line C between the ADF 1 and the reading unit 30 is turnably supported on the frame 14.

Figure 5A:
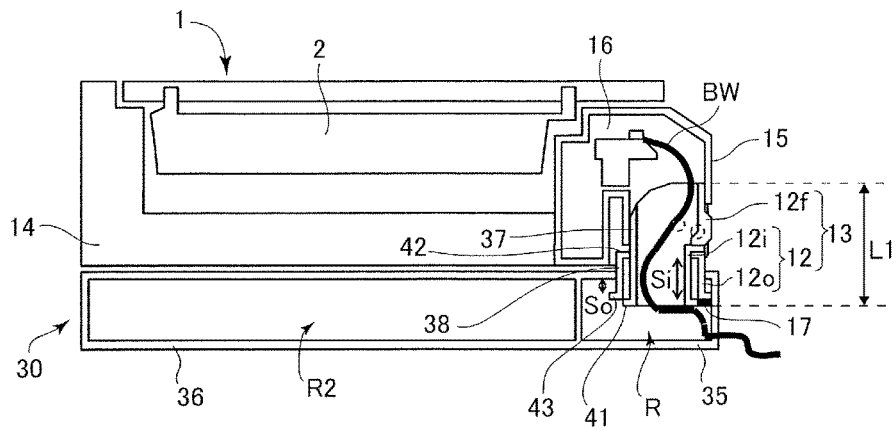
FIG. 5A is a section view taken along a line E-E in FIG. 3A illustrating a configuration of a duct in the state in which the ADF is located at the lower position.
Figure 5B:
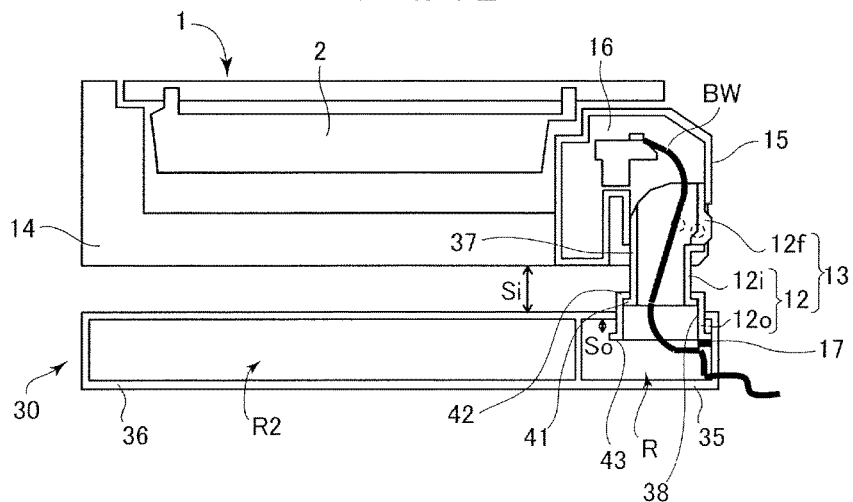
FIG. 5B is a section view taken along the line E-E in FIG. 3A illustrating the configuration of the duct in a state in which a first duct is in contact with a second duct.
Figure 5C:
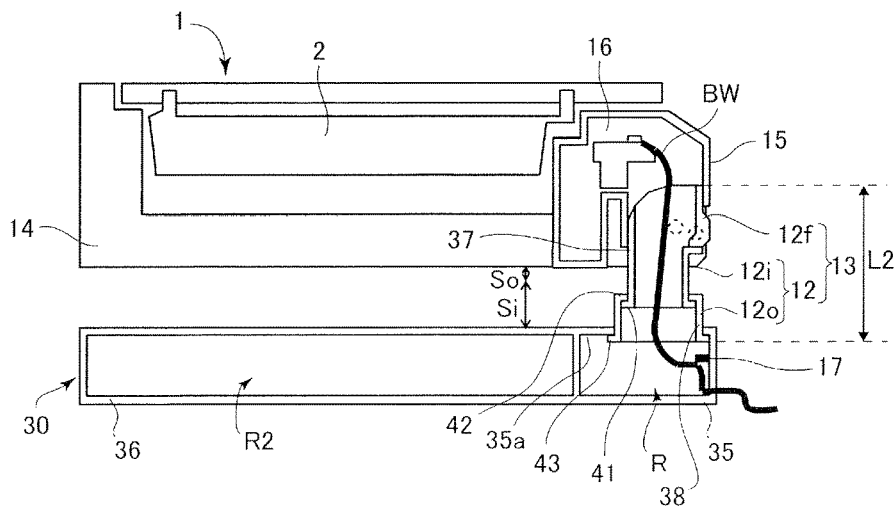
FIG. 5C is a section view taken along the line E-E in FIG. 3A illustrating the configuration of the duct in the state in which the ADF is located at the upper position.

The flat cable F transmitting the electrical signal of the second reading portion 201 to the control portion 122 is bent by a plurality of times within the ADF 1 and enters the reading unit 30 through the cable guide 16 and the duct 13. Then, the flat cable F is wired in a width direction orthogonal to the sheet conveyance direction within a space R under the duct 13 and within the reading unit 30 and is directed toward the printer body 101A. Because the space R is defined within the reading unit 30, the flat cable F may be wired in the width direction within the space R, and the image reading apparatus 103 may be attached to a plurality of types printer bodies whose flat cable connecting positions are different from each other. It is noted as illustrated in FIGS. 5A through 5C, the reading unit 30 includes a front cover 36 serving as a first part defining a reading space R2 in which the second reading portion 201 and the second holder 302 are movable in the sub-scan direction and a rear cover 35 serving as a second part defining the space R described above. The rear cover 35 is disposed in parallel with the front cover 36 in the width direction or in the main scan direction.

The signal line C of motors, sensors and USB cables also enters the reading unit 30 via the cable guide 16 and the duct 13 and is wired toward the printer body 101A. The signal line C is surrounded by a tube or is thickly coated such that the signal line C is not broken during when the ADF 1 is repeatedly opened/closed. Due to that, the signal line C enables to bend with a lager radius more than that of the flat cable F.

Still further, when the document D is to be read by the fixed-reading mode, the ADF 1 is moved in the vertical direction corresponding to a thickness of the bundle of documents D placed on the document placing table 31. Accordingly, the flat cable F and the signal line C are required to have extra lengths that enable the ADF 1 to move upward. The flat cable F and the signal line C will be referred to collectively as a 'bundled wire BW' hereinafter. Then, as illustrated in FIG. 5A, the cable guide 16 is configured such that the bundled wire BW is connected in the horizontal direction and is bent. The bundled wire BW includes a plurality of wires whose bendable radii are different.

(Configuration of Duct)

Next, a configuration of the duct 13 will be described. As illustrated in FIG. 5A, the duct 13 includes a body portion 12 and a lid portion 12f. The body portion 12 includes a first duct 12i turnably supported by the frame 14 and a second duct 12o vertically movably provided with respect to the reading unit 30. The first and second ducts 12i and 12o are provided so as to overlap with each other at inside or outside in a plane orthogonal to the vertical direction, and the first duct 12i is provided at inside of the second duct 12o in the present embodiment. That is, the first and second ducts 12i and 12o compose a double-layered structure in which they overlap with each other in the vertical direction.

The first and second ducts 12i and 12o are formed approximately into a cylindrical shape, respectively. The first duct 12i includes a cylindrical portion 37 serving as a first cylindrical portion extending in the vertical direction and covering the bundled wire BW, an outer flange portion 41 extending radially outside from a lower end of the cylindrical portion 37 and serving as an abutment portion and a first outer flange portion. The second duct 12o includes a cylindrical portion 38 extending in the vertical direction and serving as a second cylindrical portion, an inner flange portion 42 extending radially inside from an upper end of the cylindrical portion 38 and serving as a first inner flange portion, and a retaining portion 43 extending radially outside from a lower end of the cylindrical portion 38. The cylindrical portion 38 is disposed outside of the outer flange portion 41 and covers the bundled wire BW. The outer and inner flange portions 41 and 42 overlap with each other when viewed in the vertical direction. Still further, the reading unit 30 is provided with a stopper 17 being in contact with the retaining portion 43 of the second duct 12o and serving as a regulating portion regulating the second duct 12o from moving downward. It is noted that the outer flange portion 41 may not be formed at the lower end of the cylindrical portion 37, and the inner flange portion 42 may not be formed at the upper end of the cylindrical portion 38.

When the ADF 1 is located at the lower position, the outer flange portion 41 of the first duct 12i is separated from the inner flange portion 42 of the second duct 12o as illustrated in FIG. 5A. At this time, the retaining portion 43 of the second duct 12o is in contact with the stopper 17, and the outer flange portion 41 of the first duct 12i is located approximately at the same position with the stopper 17 in the vertical direction.

when the ADF 1 is moved up by the user, the outer flange portion 41 of the first duct 12i comes into contact with the inner flange portion 42 of the second duct 12o as illustrated in FIG. 5B. That is, the outer flange portion 41 comes into contact with the inner flange portion 42 of the second duct 12o on the way of the ADF 1 moving from the lower position to the upper position. When the ADF 1 is moved up further by the user, the second duct 12o moves up together with the first duct 12i because the inner flange portion 42 is raised up by the outer flange portion 41 as illustrated in FIG. 5C. Then, when the ADF 1 comes up to the upper position, the retaining portion 43 of the second duct 12o comes into contact with an inner circumferential surface 35a of the rear cover 35 of the reading unit 30, and the second duct 12o is retained from slipping out of the reading unit 30. It is noted that at this time, while the lower end of the first duct 12i, i.e., the outer flange portion 41, is located above the reading unit 30, the bundled wire BW will not be exposed out because the second duct 12o is provided between the first duct 12i and the reading unit 30.

When the ADF 1 moves from the upper position to the lower position, the second duct 12o moves downward together with the first duct 12i and abuts against the stopper 17. Then, only the first duct 12i moves downward together with the ADF 1.

A vertical overlap amount of the first duct 12i and the second duct 12o changes, and the duct 13 is stretched in the vertical direction corresponding to the upward/downward motion of the ADF 1. Then, if whole lengths of the duct 13 in the vertical direction when the ADF 1 is located at the lower position and the upper position are denoted as a whole length L1 and a whole length L2, respectively, as illustrated in FIGS. 5A and 5C, the whole length L2 is longer than the whole length L1 (L2>L1). Still further, a stroke amount of the first duct 12i with respect to the second duct 12o is denoted as a stroke amount Si and a stroke amount of the second duct 12o with respect to the reading unit 30 is denoted as a stroke amount So, the stroke Si is set to be greater than the stroke So (Si≥So).

That is, the duct 13 is configured to contract such that the whole length becomes the whole length L1 when the ADF 1 is located at the lower position while assuring the whole length L2 for protecting the bundled wire BW reliably even if the ADF 1 is located at the upper position. That is, the duct 13 is configured to be able to save a space. Still further, when the ADF 1 is located at the lower position, the second duct 12o is regulated by the stopper 17 from moving downward, and a length of the first duct 12i is set to be almost same level with the stopper 17. This arrangement assures the space R in which the bundled wire BW can be wired in the width direction as described above under the duct 13 and makes it possible to attach the image reading apparatus 103 to a plurality of types of printer bodies whose bundled wire connecting positions are different from each other. Still further, because the stroke Si of the first duct 12i is set to be greater than the stroke So of the second duct 12o, the space R under the second duct 12o can be assured to be large.

(Configuration of Lid Portion)

Figure 6A:
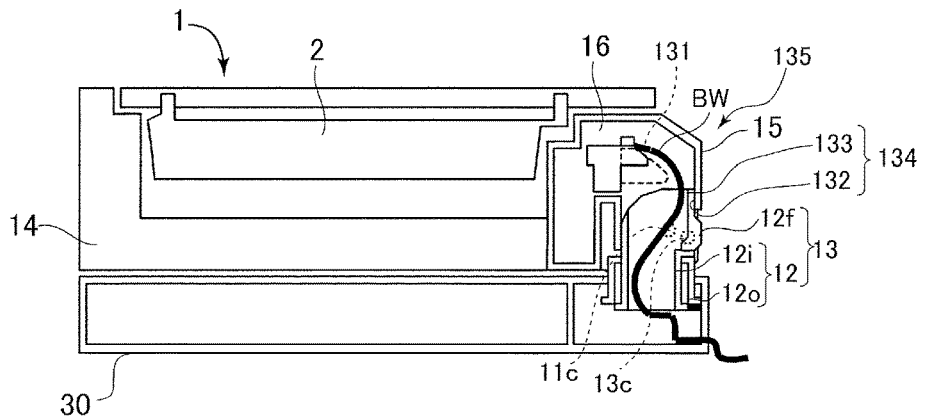
FIG. 6A is a section view illustrating a configuration around a lid portion in a state in which the ADF is closed.

As illustrated in FIGS. 4A and 6A, the ADF 1 is turnable centering on the turning fulcrum 11c, and the first duct 12i is turnable centering on a turning center 12c disposed approximately coaxially with the turning fulcrum 11c (see FIGS. 4A and 4B). By the way, an open space 50 (see FIGS. 3A and 3B) is provided between an exterior cover 15 of the ADF 1 in a closed condition and the first duct 12i such that the first duct 12i does not interfere with the exterior cover 15 when the ADF 1 is opened. For instance, it is necessary to increase a spring pressure of the hinge mechanism 11 or to add a damper mechanism if a component, such as a second reading portion 201 for example, is to be mounted on the ADF 1 and a weight of the ADF 1 increases. Then, the hinge mechanism 11 is enlarged, the turning fulcrum 11c is located above and inside of the reading unit 30 and the turning center 12c of the first duct 12i is also displaced upward. That is, if the turning fulcrum 11c is displaced above and inside more within the ADF 1, it is necessary to enlarge the open space 50.

Then, if the ADF 1 is opened by the user, a fixing portion on the ADF 1 side of the bundled wire BW comes closer to a fixing portion on the reading unit 30 side, so that the bundled wire BW expands to the rear side of the image reading apparatus 103. Due to that, there is a possibility that the bundled wire BW expanded to the rear side is damaged or broken by being pinched between the exterior cover 15 and the first duct 12i in a condition in which the bundled wire BW enters the open space 50.

Then, a lid portion 12f turnably supported by the first duct 12i is provided in the present embodiment. The lid portion 12f is made of a rigid body that is turnable centering on a turning fulcrum 13c and movable along with the opening/closing motion of the ADF 1. The turning fulcrum 13c serving as the part supporting the lid portion 12f is located below the turning fulcrum 11c of the ADF 1.

The cable guide 16 is provided with a pressing portion 131 configured to be able to press the lid portion 12f. The exterior cover 15 is also provided with a first regulating surface 132 configured to regulate a move in an open direction of the lid portion 12f. The first duct 12i is provided with a second regulating surface 133 configured to regulate the move in a close direction of the lid portion 12f. These first and second regulating surfaces 132 and 133 compose a regulating portion 134 configured to regulate a turning range of the lid portion 12f, and the pressing portion 131 and the regulating portion 134 compose an interlock portion 135 configured to turn the lid portion 12f in linkage with the opening/closing motion of the ADF 1.

Figure 6B:
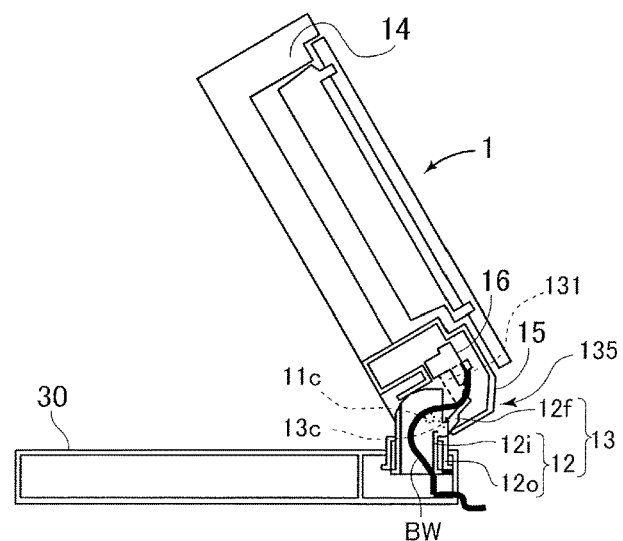
FIG. 6B is a section view illustrating the configuration around the lid portion in a state in which the ADF is opened halfway.

In the case when the ADF 1 is closed, the lid portion 12f is positioned at a closed position by the first and second regulating surfaces 132 and 133 as illustrated in FIG. 6A. At this time, the open space 50 (see FIG. 3) is covered by the lid portion 12f so that the bundled wire BW is not exposed to the outside as illustrated in FIG. 6A. When the ADF 1 is opened by the user, the pressing portion 131 presses the lid portion 12f and the lid portion 12f is opened along with the open motion of the ADF 1 as illustrated in FIG. 6B. Then, when the ADF 1 is opened to its maximum opening angle, the lid portion 12f is opened by its own weight or by being pressed by the bundled wire BW and is positioned at an opened position by the first regulating surface 132 as illustrated in FIG. 6C.

Figure 6C:
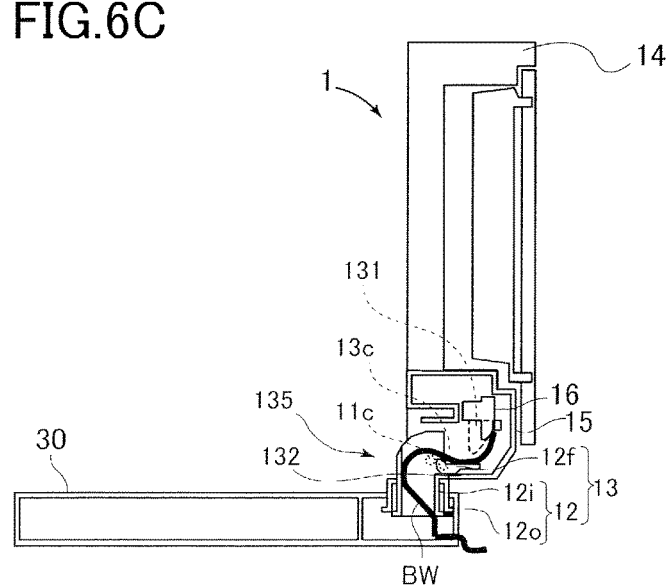
FIG. 6C is a section view illustrating the configuration around the lid portion in a state in which the ADF is opened to its maximum opening angle.

Still further, when the ADF 1 is closed from the position illustrated in FIG. 6C to the position illustrated in FIG. 6A, the lid portion 12f located at the opened position is pressed by the first regulating surface 132 and interlocks with the closing motion of the ADF 1. Then, as illustrated in FIG. 6A, the lid portion 12f is positioned at the closed position by the second regulating surface 133 when the ADF 1 is closed.

As described above, the lid portion 12f interlocks with the opening/closing motion of the ADF 1 by the interlock portion 135 such that a gap between the lid portion 12f and the ADF 1 falls within a predetermined amount. Still further, because the turning fulcrum 13c of the lid portion 12f is located below the turning fulcrum 11c of the ADF 1, it is possible to reliably protect the bundled wire BW by the lid portion 12f even if the open space 50 is enlarged to assure an turning amount of the ADF 1. That is, it is possible to prevent the bundled wire BW from being broken because the bundled wire BW will not enter the open space and not be pinched between the exterior cover 15 and the first duct 12i when the ADF 1 is opened/closed. Still further, it is possible to protect the bundled wire BW and the user and to improve an appearance because the user cannot access the bundled wire BW through the open space 50.

Second Embodiment

Next, a second embodiment of the present disclosure will be described. The second embodiment is what the configuration of the duct 13 in the first embodiment is modified. Due to that, the same components and configurations with those of the first embodiment will be omitted in the drawings or will be described by denoting the same reference numerals in the drawings. As illustrated in FIG. 7A, a duct 113 includes a body portion 112 composed of a first duct 112i serving as a first cover member and a second duct 112o serving as a second cover member. The first and second ducts 112i and 112o are provided so as to overlap with each other at inside or outside in a plane orthogonal to the vertical direction. The first duct 112i is provided outside of the second duct 112o in the present embodiment. That is, the first and second ducts 112i and 112o compose a two-layered structure in which those ducts overlap with each other in the vertical direction.

The first and second ducts 112i and 112o are formed approximately into a cylindrical shape, respectively. The first duct 112i includes a cylindrical portion 44 extending in the vertical direction and serving as a third cylindrical portion so as to cover the bundled wire BW (see FIG. 8A) and an inner flange portion 141 extending radially inside from a lower end of the cylindrical portion 44 and serving as an abutment portion and as a second inner flange portion. The second duct 112o includes a cylindrical portion 45 extending in the vertical direction and serving as a fourth cylindrical portion, an outer flange portion 142 extending radially outside from an upper end of the cylindrical portion 45 and serving as a second outer flange portion, and a retaining portion 43 extending radially outside from a lower end of the cylindrical portion 45. The cylindrical portion 45 is disposed inside of the inner flange portion 141 and covers the bundled wire BW. The inner and outer flange portions 141 and 142 overlap from each other when viewed from the vertical direction. The reading unit 30 is provided with the stopper 17 serving as a regulating portion configured to regulate a downward movement of the second duct 112*o* by abutting against the retaining portion 43 of the second duct 112*o*.

When the ADF 1 is located at the lower position, the inner flange portion 141 of the first duct 112*i* is separated from the outer flange portion 142 of the second duct 112*o* as illustrated in FIG. 7A. At this time, the retaining portion 43 of the second duct 112*o* is in contact with the stopper 17.

When the ADF 1 is moved up by the user, the inner flange portion 141 of the first duct 112*i* comes into contact with the outer flange portion 142 of the second duct 112*o* as illustrated in FIG. 7B. That is, the inner flange portion 141 comes into contact with the outer flange portion 142 of the second duct 112*o* on the way of the ADF 1 moving from the lower position to the upper position. When the ADF 1 is moved up further by the user, the second duct 112*o* moves up together with the first duct 112*i* because the outer flange portion 142 is raised by the inner flange portion 141 as illustrated in FIG. 7C. Then, when the ADF 1 is located at the upper position, the retaining portion 43 of the second duct 112*o* comes into contact with the inner circumferential surface 35*a* of the rear cover 35 of the reading unit 30 and the second duct 112*o* is retained from being pulled out of the reading unit 30. It is note that although the lower end of the first duct 112*i* is located above the reading unit 30, the bundled wire BW (see FIG. 8) stored within the duct 113 will not be exposed to the outside because the second duct 112*o* is provided between the first duct 112*i* and the reading unit 30.

During when the ADF 1 moves from the upper position to the lower position, the second duct 112*o* moves downward in a body with the first duct 112*i* and then abuts against the stopper 17. After that, only the first duct 112*i* moves downward together with the ADF 1. It is noted that because changes of the whole length of the duct 113 caused along with the move of the ADF 1 in the vertical direction and setting of the strokes of the first and second ducts 112*i* and 112*o* are the same with those of the first embodiment, their description will be omitted here.

By the way, a displacement of the bundled wire BW that bends along with the move in the vertical direction of the ADF 1 within the first duct 112*i* is greater than that within the second duct 112*o*. According to the present embodiment, the first and second ducts 112*i* and 112*o* engage within the first duct 112*i*, and the first duct 112*i* is configured such that a cross-sectional area SL of an inner space thereof is greater than a cross-sectional area SS of an inner space of the second duct 112*o* as illustrated in FIG. 7A. Due to that, it is possible to largely bend the bundled wire BW within the first duct 112*i* to reduce a damage otherwise given to the bundled wire BW. Still further, it is possible to attach the image reading apparatus 103 to a plurality of types of printer bodies whose connecting positions are different from each other because a space R in which the bundled wire BW can be wired in the width direction is assured under the second duct 112*o* similarly to the first embodiment.

As illustrated in FIG. 8A, the duct 113 includes the lid portion 112*f* fixed by the fixture 113*c* serving as a component supporting the lid portion 112*f* to the first duct 112*i*. The lid portion 112*f* is made of an elastic body such as a rubber member and a sheet member. The fixture 113*c* is disposed under the turning fulcrum 11*c* of the ADF 1, so that the ADF 1 can be opened largely.

When the ADF 1 is opened, the bundled wire BW expands to the rear side of the apparatus and presses the lid portion 112*f* as illustrated in FIG. 8. When the ADF 1 is closed, the lid portion 112*f* returns to its original position by its own resilient force. That is, the lid portion 112*f* moves while protecting the bundled wire BW in linkage with the opening/closing motion of the ADF 1. This arrangement makes it possible to prevent the bundled wire BW from being exposed to outside through the open space (see FIGS. 3A and 3B) and from being broken. This arrangement also makes it possible to protect the bundled wire BW and the user because the user is unable to access the bundled wire BW through the open space 50 and to improve the appearance.

It is noted that although the body portion of the duct has been configured by the double-layer in the first and second embodiments, the body portion of the duct may be configured by three or more layers. Still further, although the body portion of the duct has been formed into the cylindrical shape, the present disclosure is not limited to such shape and a cross-section of the body portion may be square or the like for example.

Still further, although a lower limit position of the second duct has been regulated by providing the stopper 17 in the first and second embodiments, the present disclosure is not limited to such configuration. For instance, instead of the stopper 17, it is also possible to provide an urging portion such as a spring urging the second duct to the first duct. In this case, when the ADF 1 is moved from the lower position to the upper position, the first and second ducts move upward in a body at first and the first duct moves with respect to the second duct by resisting against an urging force of the urging portion after when the regulating portion of the second duct abuts against the rear cover of the reading unit.

Still further, it is possible to use not only the CIS but also a charge coupled device (CCD) for the first and second reading portions 151 and 201 in the first and second embodiments. Still further, it is not only possible to mount the image reading apparatus 103 on various image forming apparatuses such a copier, a facsimile machine, a printer and a multi-function printer, but also is possible to use as a stand-alone apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-117245, filed on Jun. 13, 2016, which is hereby incorporated by reference wherein in its entirety.

What is claimed is:
1. An image reading apparatus, comprising:
a reading unit including a transparent portion and a reading portion configured to read an image on a sheet through the transparent portion;
a conveyance unit disposed above the reading unit and configured to convey the sheet toward the transparent portion;
a support portion configured to support the conveyance unit openably and movably with respect to the reading unit in a vertical direction between an upper position and a lower position;

a bundled wire transmitting a signal or electric power to the conveyance unit and passing through the reading unit; and a cover portion configured to cover the bundled wire between the reading unit and the conveyance unit, the cover portion comprising a first cover member provided on the conveyance unit and a second cover member provided movably in the vertical direction with respect to the reading unit and so as to overlap with the first cover member at inside or outside of the first cover member in a plane orthogonal to the vertical direction, wherein a whole length of the cover portion in the vertical direction in a case where the conveyance unit is located at the upper position is longer than a whole length of the cover portion in the vertical direction in a case where the conveyance unit is located at the lower position, wherein the first cover member comprises an abutment portion configured to come into contact with the second cover member on the way of the conveyance unit moving from the lower position to the upper position, and wherein the second cover member is configured to move upward together with the first cover member in a state in which the second cover member is in contact with the abutment portion.

2. The image reading apparatus according to claim 1, wherein a stroke of the first cover member with respect to the second cover member is greater than a stroke of the second cover member with respect to the reading unit.

3. The image reading apparatus according to claim 1, wherein a lower end of the first cover member is located above the reading unit in a case where the conveyance unit is located at the upper position.

4. The image reading apparatus according to claim 1, wherein the first cover member is set to be a length of creating a space in which the bundled wire can be wired in a width direction orthogonal to a sheet conveyance direction under the first cover member and inside of the reading unit in a case where the conveyance unit is located at the lower position.

5. The image reading apparatus according to claim 4, further comprising a regulating portion configured to regulate the second cover member from moving downward so as to have the space under the second cover member and inside of the reading unit in a case where the conveyance unit is located at the lower position.

6. The image reading apparatus according to claim 5, wherein the reading unit comprises a first part defining a reading space in which the reading portion is movable and a second part disposed in parallel with the first part in the width direction and defining the space.

7. The image reading apparatus according to claim 1, wherein the first cover member comprises a first cylindrical portion configured to cover the bundled wire, and a first outer flange portion serving as an abutment portion extending outside from a lower end of the first cylindrical portion, the second cover member comprises a second cylindrical portion disposed outside of the first outer flange portion and configured to cover the bundled wire, and a first inner flange portion extending inside from an upper end of the second cylindrical portion, and the second cover member is configured to move upward together with the first cover member in a state in which the first inner flange portion is in contact with the first outer flange portion.

8. The image reading apparatus according to claim 7, wherein the first outer flange portion and the first inner flange portion overlap with each other in a view from the vertical direction.

9. The image reading apparatus according to claim 1, wherein the first cover member comprises a third cylindrical portion configured to cover the bundled wire, and a second inner flange portion serving as the abutment portion extending inside from a lower end of the third cylindrical portion, the second cover member comprises a fourth cylindrical portion disposed inside of the second inner flange portion and configured to cover the bundled wire, and a second outer flange portion extending outside from an upper end of the fourth cylindrical portion, and the second cover member is configured to move upward together with the first cover member in a state in which the second outer flange portion is in contact with the second inner flange portion.

10. The image reading apparatus according to claim 9, wherein the second inner flange portion and the second outer flange portion overlap with each other in a view from the vertical direction.

11. The image reading apparatus according to claim 9, wherein a cross-sectional area of an inner space of the third cylindrical portion is greater than a cross-sectional area of an inner space of the fourth cylindrical portion.

12. The image reading apparatus according to claim 1, wherein the bundled wire comprises a plurality of wires whose bendable radii are different.

13. The image reading apparatus according to claim 1, wherein the reading unit comprises a placing portion on which a sheet is to be placed, the conveyance unit comprises a pressure plate portion pressing the sheet placed on the placing portion from above the sheet, and the reading portion is configured to read an image on the sheet placed on the placing portion while moving.

14. The image reading apparatus according to claim 1, wherein the reading portion is a first reading portion, and the conveyance unit comprises a second reading portion configured to read an image of a second surface which is an opposite side of a first surface which is to be read by the first reading portion of the sheet conveyed by the conveyance unit, and configured such that the bundled wire is connected thereto.

15. An image forming apparatus comprising:
the image reading apparatus as set forth in claim 1; and
an image forming unit configured to form an image read by the image reading apparatus onto a sheet.

* * * * *